Patented Sept. 29, 1942

2,297,024

UNITED STATES PATENT OFFICE 2,297,024

DIARYLSULPHONE DERIVATIVES

Paul Pöhls and Fritz Mietzsch, Wuppertal-Elberfeld, Germany, assignors to Winthrop Chemical Company, Inc., New York, N. Y., a corporation of New York No Drawing. Application May 17, 1939, Serial No. 274,228. In Germany May 20, 1938

10 Claims. (Cl. 260—397.6)

This invention relates to diphenylsulphone derivatives and to a process of manufacturing the same.

It is known that the 4.4'-diaminodiphenylsulphone and certain derivatives thereof have a favorable influence on the streptococci infections of the warm-blooded individuals. These compounds are not suitable for injection purposes, since the mineral acid salts of the 4.4'-diaminodiphenylsulphone because of a low basicity of the base react acid to congo and, therefore, cause necrosis upon subcutaneous injection. Besides the base itself causes a strong formation of methaemoglobin. By acylation of the aromatic amino groups derivatives of the 4.4'-diaminodiphenylsulphone were obtained, the methaemoglobin-forming activity of which sometimes is reduced; but these compounds are practically insoluble in water, so that they can be injected only in suspension.

According to the present invention colorless, readily soluble and neutrally reacting products can be obtained being suitable for injection purposes and having a high activity on streptococci infections by the manufacture of compounds which contain in the 4- and 4'-positions bound by carbamide, thiocarbamide or guanidine groups organic radicals, bearing on their part, if desired in the form of the salts with bases, groups rendering the products soluble in water with neutral reaction. The diphenylsulphone radical may bear further substituents, such as free or closed hydroxyl- or amino-groups, alkyl-, nitro or halogen-groups. The organic radicals, substituted by groups rendering the products soluble in water may be aliphatic, aromatic and/or heterocyclic radicals. Carboxylic acid-, sulphonic acid- or sulphinic acid groups or some hydroxyl groups aliphatically bound, such as the polyhydroxyl compounds derived from sugars, may be used as solubilizing groups. The aforenamed compounds preferably are used in the form of their salts with inorganic or organic bases for injection purposes. For this purpose, for instance, the sodium-, ammonium-, calcium-salts or the salts with diethylamine, ethanolamine, diethanolamine, piperidine, ethylenediamine, piperazine and the like may be used. The new compounds have proved as being very stable. The compounds containing urea groups have, for instance, the formula

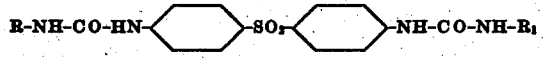

wherein R and R₁ stand for a radical rendering the products soluble in water which radical is selected from the group consisting of the radicals of aliphatic polyhydroxy compounds, and of aliphatic radicals and aromatic radicals of the benzene and naphthalene series which aliphatic and aromatic radicals contain an acid group.

In accordance with the present invention the aforedescribed compounds can be prepared, for instance, when reacting di-isocyanates, di-ureachlorides, di-urethanes, di-carboxylic acid azides, di-isothiocyanates, di-cyanamino compounds, di-dithiocarbamic acid ester or di-isothiourea ether derivatives of diphenylsulphone containing the said groups in the 4- and 4'-positions or of its nuclear substitution products with organic compounds containing apart from an amino group in the least a group rendering the products soluble in water, for instance a carboxylic acid, sulphonic acid or sulphinic acid group or some aliphatically bound hydroxyl groups. Thus, for instance, aminoalkyl- or aminoarylalkylcarboxylic acids, such as glycocoll and aminophenylacetic acid, aminoalkylsulphonic acids, such as taurin, aminoaryl-carboxylic acids, -sulphonic acids or -sulphinic acids, as for instance aminobenzenecarboxylic acids, aminobenzenesulphonic acids, aminonaphthalenesulphonic acids, aminobenzenesulphinic acids, aminoquinolinesulphonic acids or nuclear substitution products of these compounds or amino derivatives of polyvalent alcohols may be used. Vice-versa the reaction may also be carried out by reacting isocyanates, ureachlorides, urethanes, carboxylic acid azides, isothiocyanates, dithiocarbamic acid esters, cyanamino compounds or isothiourea ethers of organic compounds, containing the radicals rendering the products soluble in water of the above described kind, with 4.4'-diaminodiphenylsulphone or its nuclear substitution products.

The process may also be performed by converting into the above described diphenylsulphone compounds derivatives of the diphenylsulphides or diphenylsulphoxides which may be substituted and which contain in the 4- and 4'-positions, bound by carbamido, thiocarbamido or guanidine groups, organic radicals which on their part are substituted by groups rendering the products soluble in water with neutral reaction, by means of oxidizing agents such as hydrogen peroxide and permanganate.

The new compounds can also be prepared by exposing simultaneously 4.4'-diaminodiphenylsulphone derivatives and organic amino compounds with a group rendering the products soluble in water to the action of phosgene, thiophosgene or to their equivalents which are suitable for the formation of urea or thiourea compounds respectively, such as urea, thiourea, carbondisulphide, dialkylcarbonates and diarylcarbonates.

The compounds also can be obtained by introducing the groups rendering the products, if desired in the form of their salts with bases, soluble in water with neutral reaction, into organic radicals according to the methods usual for the introduction of these groups, the radicals on their part being connected by means of urea, thiourea or guanido groups with the 4- and 4'-positions of the diphenylsulphone or its nuclear substitution products. The introduction of the groups can be caused directly or by means of groups which are present in the initial material and are convertible into carboxylic-, sulphonic-, sulphinic- or aliphatic hydroxyl groups. For this purpose carboxylic acid-esters, -amides or -nitriles, sulphonic acid ester, sulphinic acid esters or acyl derivatives of aliphatic polyhydroxy compounds may be saponified, or products containing groups of lower oxidation than the carboxylic acid, sulphonic- or sulphinic acid group, such as methyl-, aldehyde- or mercapto-groups are oxidized to the carboxylic acid-, sulphonic acid- or sulphinic acid compounds.

The invention is illustrated by the following examples without being restricted thereto:

Example 1

36.2 grams of 5-amino-1.3-benzenedicarboxylic acid are dissolved in 200 ccs. of 2-normal sodium hydroxide solution. Thereupon a solution of 30 grams of diphenylsulphone-4.4'-di-isocyanate in 300 ccs. of acetone is slowly added drop by drop at a temperature of 45° C. during 2 hours. The reaction mixture is subsequently stirred at 45° C. for 3 hours, filtered and the acetone is evaporated on the water-bath. The remaining aqueous solution is filtered once again and the bis-[N'-(3'.5'-dicarboxyphenyl)-carbamido-N-phenyl-4]-sulphone, being readily soluble in sodium hydroxide and sodium carbonate solutions, is obtained from the filtrate by means of dilute hydrochloric acid.

13.7 grams of anthranilic acid are treated in the same manner with 15 grams of diphenylsulphone-4.4'-di-isocyanate and the bis-[N'-(2'-carboxyphenyl)-carbamido-N-phenyl-4]-sulphone is obtained.

The diphenylsulphone-4.4'-di-isocyanate used as starting material is obtained in the following manner: 480 grams of 4.4'-diamino-diphenylsulphone-dihydrochloride are suspended in 3000 ccs. of ortho-dichlorobenzene. Phosgene is introduced into the suspension while stirring at 180° C. until the dihydrochloride has completely dissolved. The solution is freed from some impurities present by filtration and concentrated to a far reaching extent under reduced pressure. The diphenylsulphone-4.4'-di-isocyanate melting at 149° C. crystallizes from the concentrated solution in the cold.

Example 2

27.4 grams of para-aminobenzoic acid are dissolved in 250 ccs. of acetone. A solution of 30 grams of diphenylsulphone-4.4'-di-isocyanate in 300 ccs. of acetone is slowly dropped in while stirring at a temperature of 45° C. After 3 hours' stirring at 45° C. the solution is filtered from some undissolved substance present and the filtrate is concentrated; thereupon 54 grams of bis-[N'-(4'-carboxyphenyl)-carbamido-N-phenyl-4]-sulphone crystallize. This product is soluble in the cold in dilute sodium hydroxide and sodium carbonate solutions.

Example 3

20.2 grams of a 96.5% sodium sulphanilate are dissolved in 100 ccs. of water. A solution of 15 grams of diphenylsulphone-4.4'-di-isocyanate in 150 ccs. of acetone is added drop by drop while stirring at 45 C. After half an hour's stirring at 45° C. the reaction solution is filtered and the acetone is evaporated. The remaining aqueous solution yields after the addition of sodium chloride the di-sodium salt, being readily soluble in water with neutral reaction, of the bis-[N'-(4'-phenylsulphonic acid)-carbamido-N-phenyl-4]-sulphone.

When dissolving 29.1 grams of the acid potassium salt of the aniline-3.5-disulphonic acid in 100 ccs. of normal potassium hydroxide solution and when adding as described above 15 grams of diphenysulphone-4.4'-di-isocyanate in acetone, 37.5 grams of tetrapotassium salt of the bis-[N'-(3'.5'-phenyldisulphonic acid)-carbamido-N-phenyl-4]-sulphone being readily soluble in water are obtained from the remaining aqueous solution by the addition of potassium chloride.

Example 4

25.4 grams of sodium 1-naphthylamine-4-sulphonate are dissolved in 100 ccs. of water. A solution of 15 grams of diphenylsulphone-4.4'-di-isocyanate in 150 ccs. of acetone are added drop by drop while stirring at 45° C. After 2 hours' stirring at 45–50° C. the solution is freed from some undissolved substance present by filtration with suction and the acetone is evaporated. 31 grams of di-sodium salt of the bis-[N'-(4'-naphthalenesulphonic acid)-carbamido-N-phenyl-4]-sulphone are obtained from the remaining aqueous solution after the addition of sodium chloride.

In an analogous manner the tetrasodium salt of the bis-[N'-(4'.8'-naphthalenedisulphonic acid)-carbamido-N-phenyl-4]-sulphone being readily soluble in water with neutral reaction is obtained from 69.4 grams of 1-naphthylamine-4.8-disulphonic acid sodium and 30 grams of diphenylsulphone-4,4'-di-isocyanate; the tetrasodium salt of the bis-[N'-(3'.6'-naphthalenedisulphonic acid)-carbamido-N-phenyl-4]-sulphone are obtained from 65 grams of the sodium salt of the 1-naphthylamine-3.6-disulphonic acid and 30 grams of diphenylsulphone-4.4'-di-isocyanate; the hexasodium salt of the bis-[N'-(3'.6'.8'-naphthalenetrisulphonic acid)-carbamido-N-phenyl-4]-sulphone from 85.4 grams of the di-sodium salt of the 1-naphthylamine-3.6.8-trisulphonic acid and 30 grams of diphenylsulphone-4.4'-di-isocyanate; 112 grams of hexasodium salt of the bis-[N'-(4'.6'.8'-naphthalenetrisulphonic acid)-carbamido-N-phenyl-4]-sulphone from 85.4 grams of the disodium salt of the 1-naphthylamine-4.6.8-trisulphonic acid and 30 grams of diphenylsulphone-4.4'-di-isocyanate.

Example 5

37.8 grams of 1-amino-3-phenol-4-sulphonic acid are dissolved in 100 ccs. of 2-normal sodium hydroxide solution. A solution of 30 grams of diphenylsulphone-4.4'-di-isocyanate in 300 ccs. of acetone are added drop by drop while stirring at a temperature of 45° C. After 3 hours' stirring the reaction solution is filtered, the acetone evaporated and the remaining aqueous solution poured into a 35% sodium chloride solution while stirring, whereupon the disodium salt of the bis-[N'-(3'-hydroxyphenyl-4'-sulphonic acid)-carbamido-N-phenyl-4]-sulphone precipitates. It is soluble in cold water with neutral reaction.

Example 6

43.6 grams of 1.4-phenylenediamine-2.6-disulphonic acid are dissolved in 200 ccs. of 2-normal sodium hydroxide solution. A solution of 30 grams of diphenylsulphone-4.4'-di-isocyanate in 300 ccs. of acetone is added drop by drop at 45° C. while stirring. After 3 hours' heating at 45° C. the reaction mixture is filtered, the acetone is evaporated and the aqueous solution acidified with dilute hydrochloric acid, whereupon the disodium salt of bis-[N'-(4'-aminophenyl-3',5'-disulphonic acid)-carbamido-N-phenyl-4]-sulphone precipitates.

Example 7

A solution of 25.2 grams of diphenylsulphone-4.4'-di-isocyanate in 200 ccs. of acetone is added drop by drop to a solution of 26.3 grams of para-aminobenzene-sulphinic acid in 168 ccs. of normal sodium-hydroxide solution at a temperature of 45° C. After 2 hours' stirring at 50° C. the acetone is evaporated and the remaining aqueous solution is acidified with dilute hydrochloric acid, whereupon the bis-[N'-(phenyl-4'-sulphinic acid)-carbamido-phenyl-4]-sulphone precipitates.

Example 8

100 ccs. of 2-normal sodium hydroxide solution are added to a solution of 15 grams of glycocoll in 100 ccs. of water. A solution of 30 grams of diphenylsulphone-4.4'-di-isocyanate in 300 ccs. of acetone is added drop by drop while stirring at a temperature of 50° C. After 3 hours' stirring at 50° C. the acetone is evaporated and the bis-(N'-methylcarboxylic acid carbamido-N-phenyl-4)-sulphone being readily soluble in alkali is precipitated from the remaining aqueous solution by means of dilute hydrochloric acid.

Example 9

A solution of 15 grams of diphenylsulphone-4.4'-di-isocyanate in 200 ccs. of acetone is added drop by drop to a solution of 18.1 grams of d-glucamine in 250 ccs. of water at a temperature of 50° C. during two hours while stirring. After 2 hours' stirring at 50° C. the acetone is evaporated and the remaining aqueous solution is removed under reduced pressure. The remaining bis-[N'-(1'.2'.3'.4'.5'-pentoxy-hexyl-6')-carbamido-N-phenyl-4]-sulphone dissolves in water when softly heated.

Example 10

23 grams of bis-[N'-(6'-carbomethoxy-naphthyl-2')-carbamido-N-phenyl-4]-sulphone are boiled with 150 ccs. of alcohol, 40 ccs. of sodium hydroxide solution (33%) and 40 ccs. of water for 1 minute under reflux. A clear solution is obtained, which is poured into dilute hydrochloric acid while stirring. The corresponding dicarboxylic acid precipitates thereupon. 17.7 grams of the acid melting above 300° C. are obtained after filtration with suction, washing with water and drying at 100° C. The acid is readily soluble in warm sodium carbonate solution.

The starting material is obtained in the following manner: A suspension of 98.5 grams of 2-naphthylamino-6-carboxylic acid methyl ester melting at 160–161° C. in 1500 ccs. of ortho-dichlorobenzene is heated in an oil bath, which latter one is heated to 110° C. and hydrogen chloride is introduced for 3 hours whereupon the hydrochloric salt is formed. Subsequently phosgene is introduced into the mixture at 170–180° C. for 12 hours until the hydrochloric salt has dissolved. After concentration about 70 grams of the naphthyl-(2)-isocyanate-6-carboxylic acid-methylester distil under 2 mms. pressure at 183° C. The distillate solidifies to crystals melting at 123° C.

24.8 grams of 4.4'-diaminodiphenylsulphone and 45.4 grams of naphthyl-(2)-isocyanate-6-carboxylic acid methylester are boiled under reflux in 400 ccs. of acetone for 2 hours. The bis-[N'-(6'-carbomethoxy-naphthyl-2')-carbamido-N-phenyl-4]-sulphone obtained is filtered with suction in the cold, washed with ether and dried at 100° C. 63 grams melting at 239–240° C. (with decomposition) are obtained.

The same condensation product can be obtained when boiling 11.2 grams of diphenylsulphone-4.4'-di-isocyanate and 15 grams of 2-naphthylamine-6-carboxylic acid methylester in 250 ccs. of acetone under reflux for 2 hours. The condensation product which has separated is filtered with suction, washed with acetone and ether and dried at 100° C. 23 grams of the condensation product are obtained melting somewhat lower than in the above described case.

Example 11

15 grams of bis-[N'-(3'-carbomethoxy-naphthyl-2')-carbamido-N-phenyl-4]-sulphone are saponified with alcoholic sodium hydroxide solution 10%) by short boiling, the acid formed precipitated with hydrochloric acid, washed with water and dried at 100° C. 12 grams melting at a temperature above 300° C. are obtained.

The starting material is obtained in the following manner:

15 grams of diphenylsulphone-4.4'-di-isocyanate and 20.1 grams of 2-naphthyl-amine-3-carboxylic acid methylester (obtained when boiling 2-naphthylamine-3-carboxylic acid with methyl-alcohol in the presence of concentrated sulphuric acid, yellow powder melting at 99–100° C.) are boiled under reflux in 250 ccs. of acetone for 12 hours. The clear acetone solution is concentrated and the condensation product precipitated after cooling is filtered with suction, washed with ether and dried at 100° C. 15.5 grams melting at 181° C. (with decomposition) are obtained.

Example 12

17.5 grams of bis-[N'-(4'carbomethoxyphenyl)-carbamido-N-phenyl-4]-sulphone are saponified with alcoholic sodium hydroxide solution (10°). Upon acidification 13 grams of an acid are obtained which is readily soluble in warm sodium carbonate solution and melts at 263° C. (with decomposition).

The starting material is obtained in the following manner:

16.5 grams of para-aminobenzoic acid ethylester and 15 grams of diphenylsulphone-4.4'-di-isocyanate are boiled under reflux in 250 ccs. of acetone for 12 hours. The clear acetone solution is concentrated, the condensation product precipitated is filtered with suction, washed with ether and dried at 100° C. 17.5 grams are obtained melting at 164° C. (with decomposition).

The same product is obtained when boiling in 250 ccs. of acetone under reflux for 12 hours 12.4 grams of 4.4'-diaminodiphenylsulphone and 19.1 grams of para-phenyliso-cyanate-carboxylic acid ethylester (boiling at 135–140° C. under 13 mms. pressure; obtained from para-aminobenzoic acid ethylester-hydrochloride and phosgene in ortho-dichloro-benzene at 170° C.). The clear acetone solution is concentrated and the condensation product precipitated is filtered with suction, washed with ether and dried at 100° C. 15.5 grams melting at 166° C. (with decomposition) are obtained.

Example 13

25 grams of bis-[N'-(3'.5'-di-carbomethoxyphenyl)-carbamido-N-phenyl-4]-sulphone are saponified with alcoholic sodium hydroxide solution (10%). The acid obtained after acidification (21 grams) decomposes on heating at 243° C.

The starting material is obtained as follows:

15 grams of diphenylsulphone-4.4'-di-isocyanate and 20.9 grams of 1-amino-benzene-3.5-dicarboxylic acid methylester are boiled under reflux in 250 ccs. of acetone for 12 hours. The clear acetone solution is concentrated and after cooling the precipitated condensation product is filtered with suction, washed with acetone and ether and dried at 100° C. 25.5 grams melting at 182° C. are obtained.

The same product may be obtained when boiling under reflux 12.4 grams of 4.4'-diamino-di-phenylsulphone and 1-isocyanate-benzene-3.5-dicarboxylic acid methylester (melting at 107° C., obtained from 1-aminobenzene-3.5-di-carboxylic acid methylester-hydrochloride and phosgene in ortho-dichlorobenzene at 170–180° C.) in 250 ccs. of acetone for 12 hours. The clear acetone solution is concentrated and the precipitated condensation product is filtered with suction, washed with acetone and ether and dried at 100° C. 32 grams melting at 180–181° C. (with decomposition) are obtained.

Example 14

17 grams of bis-[N'-(3'-cyanphenyl)-carbamido-N-phenyl-4]-sulphone are saponified with alcoholic sodium hydroxide solution (10%) by a short boiling and the carboxylic acid thus formed (14 grams melting above 300° C.) is precipitated in the cold by acidification.

The starting material is obtained in the following manner:

11.8 grams of 3-aminobenzonitril and 15 grams of diphenylsulphone-4.4'-di-isocyanate are boiled under reflux for 12 hours in 250 ccs. of acetone. The condensation product thus obtained is filtered with suction, washed with ether and dried at 100° C. 17.5 grams of the condensation product melting at 264–265° C. (with decomposition) are obtained.

Example 15

49.5 grams of bis-[N'-carbomethoxymethyl-carbamido-N-phenyl-4]-sulphone are suspended in dilute sodium hydroxide solution (10%). The solution is stirred for 10 minutes at 50° C. The yellowish colored clear solution is acidified with dilute hydrochloric acid and the dicarboxylic acid formed is precipitated as an amorphous powder. 35.5 grams melting at 197° C. are obtained after filtering with suction, washing with water and drying at 100° C.

The starting material is prepared in the following manner:

21.6 grams of 4.4'-diaminodiphenylsulphide and 26 grams of isocyanato-acetic ester are boiled under reflux in 250 ccs. of acetone for 2 hours. The condensation product formed which has separated in crystals is filtered with suction, washed with ether and dried at 100° C. 39 grams melting at 189° C. are thus obtained.

19 grams of this condensation product are suspended in 150 ccs. of glacial acetic acid and 50 ccs. of hydrogen peroxide are added. While stirring the product gradually dissolves. The crystalline precipitate obtained after 16 hours' further stirring is filtered with suction, washed with water and dried at 100° C. It melts at 206–207° C.

The same product is obtained when boiling under reflux 24.8 grams of 4.4'-diaminodiphenylsulphone and 25.8 grams of isocyanato-acetic ester in 250 ccs. of acetone for 4 hours. The acetone solution is concentrated. The condensation product which has separated in crystals is filtered with suction, washed with ether and dried at 100° C. 49.5 grams melting at 207–208° C. (with decomposition) are obtained.

The same product is obtained when boiling under reflux 23.2 grams of 4.4'-diaminodiphenylsulphoxide and 26 grams of isocyanato-acetic ester in 250 ccs. of acetone for 4 hours. The acetone solution is concentrated and the condensation product which has separated in crystals is sucked off, washed with ether and dried at 100° C. 49 grams are obtained, melting at 200° C.

The corresponding sulphone compound melting at 207–208° C. is obtained herefrom by treatment with hydrogen peroxide in glacial acetic acid solution.

Example 16

28 grams of bis-[N'-carbomethoxymethyl-carbamido-N-phenyl-2-methyl-4]-sulphone are suspended in dilute sodium hydroxide solution (10%). The mixture is stirred at 50° C. for 10 minutes, acidified and the dicarboxylic acid is precipitated as an amorphous powder. 24 grams melting at 198° C. are obtained after sucking off, washing with water and drying at 100° C.

The starting material is prepared in the following manner: 14.5 grams of 4.4'-diamino-2.2'-dimethyl-diphenyl-sulphone and 13.6 grams of isocyanato-acetic ester in 250 ccs. of acetone are boiled under reflux for 4 hours. Upon evaporation of the acetone the condensation product precipitates. 28 grams melting at 208–210° C. are obtained after sucking off, washing with ether and drying at 100° C.

Example 17

40 grams of bis-[N'-(2-chloro-5'-phenylsulphonic acid phenylester)-carbamido-N-phenyl-4]-sulphone are saponified by short boiling with alcoholic sodium hydroxide solution (10%). 30 grams of disodium salt of the corresponding disulphonic acid crystallize out in the cold.

The starting material is obtained in the following manner:

15 grams of diphenylsulphone-4.4'-di-isocyanate and 28.4 grams 4-chloro-3-aminobenzene-sulphonic acid phenylester in 200 ccs. of acetone are boiled under reflux for 6 hours. The acetone solution is concentrated and stirred with water, whereupon the condensation product precipitates in the beginning as a semisolid substance which after a prolonged storing solidifies.

The 4-chloro-3-amino-benzenesulphonic acid phenylester is prepared by reducing 140 grams of 2-nitro-1-chlorobenzene-4-sulphonic acid phenylester (from the corresponding sulphochloride and sodium phenolate, melting at 72° C.) with 400 grams of iron in 1000 ccs. of water and 10 ccs. of glacial acetic acid. The iron residue is extracted with boiling acetone. 110 grams of 2-amino-1-chlorobenzene-4-sulphonic acid phenylester melting at 114–115° C. remain after evaporation of the acetone.

Example 18

36 grams of bis-[N'-phenyl-carbamido-N-phenyl-4]-sulphone are introduced into 250 ccs. of chlorosulphonic acid while stirring, whereupon the temperature rises to 40° C. After 3 hours' stirring at 80° C. the reaction solution is poured on to ice, the precipitate is sucked off, washed with water and well pressed off. The reaction product, probably having the constitution of a bis-[N'-4'-sulphochloridephenyl)-carbamido-N-phenyl-4]-sulphone, is dissolved by gentle heating with dilute sodium hydroxide solution (10%), and the disodium salt of the bis-[N' - (4' - phenylsulphonic acid) - carbamido-N-phenyl-4]-sulphone is salted out with sodium chloride.

The starting material is prepared in the following manner:

24.8 grams of 4.4'-diaminodiphenylsulphone and 23.8 grams of phenylisocyanate are boiled under reflux in 250 ccs. of acetone for 4 hours. The acetone solution is concentrated and the crystallized condensation product is sucked off, washed with ether and dried at 100° C. 36 grams melting at 250–251° C. (with decomposition) are obtained.

Example 19

17.3 grams of aniline-2-sulphonic acid are dissolved in 50 ccs. of 2-normal sodium hydroxide solution and 100 ccs. of water. A solution of 15 grams of diphenylsulphone-4.4'-di-isocyanate in 150 ccs. of acetone is added drop by drop while stirring at 45° C. After 1 hour's stirring at 45–50° C. the reaction solution is filtered and the acetone evaporated. The remaining aqueous solution (200 ccs.) is poured into 800 ccs. of a 35% sodium chloride solution while stirring, whereupon the disodium-salt of the probably formed bis-[N'-(2'-phenyl-sulphonic acid)-carbamido-N-phenyl-4]-sulphone precipitates. The disodium salt is redissolved from hot water for purification purposes and reprecipitated by pouring the aqueous solution into a 35% sodium chloride solution while stirring.

In an analogous manner 25 grams of the disodium salt of the bis-[N'-(3'-phenyl-sulphonic acid)-carbamido-N-phenyl-4]-sulphone are obtained from 17.3 grams of aniline-3-sulphonic acid and 15 grams of diphenylsulphone-4.4'-di-isocyanate.

Example 20

24.5 grams of sodium-1-naphthylamine-6-sulphonate are dissolved in 150 ccs. of water. A solution of 15 grams of diphenylsulphone-4.4'-di-isocyanate in 150 ccs. of acetone is added drop by drop while stirring at 45° C. After 3 hours' stirring at 50° C. the solution is filtered while hot and the acetone evaporated from the filtrate. The remaining aqueous solution (265 ccs.) is poured into 800 ccs. of a 35% sodiumchloride solution while stirring, whereupon the disodium salt of the bis-[N'-(6'-naphthalene-sulphonic acid) - carbamido - N - phenyl - 4]-sulphone probably formed precipitates. The yield amounts to 35 grams.

31.5 grams of the dipotassium salt of the bis-[N'-(8'-naphthalene sulphonic acid)-carbamido-N-phenyl-4]-sulphone are obtained from 26.1 grams of potassium-1-naphthylamine-8-sulphonate and 15 grams of diphenylsulphone-4.4'-di-isocyanate.

Example 21

18.8 grams of 1.3-phenylenediamine-4-sulphonic acid are dissolved in 50 ccs. of 2-normal-sodium hydroxide solution and 100 ccs. of water. A solution of 15 grams of diphenylsulphone-4.4'-di-isocyanate in 150 ccs. of acetone are added drop by drop at ordinary temperature while stirring. The temperature rises from 20 up to 30° C. After 5 hours' stirring the solution is freed by filtration from some undissolved substance present and the acetone is evaporated from the filtrate. 18 grams of bis-[N'-3'-aminophenyl-4'-sulphonic acid)-carbamido-N-phenyl-4]-sulphone are precipitated from the remaining aqueous solution by concentrated hydrochloric acid.

Example 22

65 grams of 2-naphthylamine-3.6-disulphonic acid (mono-sodium salt) are dissolved in 100 ccs. of 2-normal sodium hydroxide solution and 250 ccs. of water. A solution of 30 grams of diphenylsulphone-4.4'-di-isocyanate in 250 ccs. of acetone are added drop by drop while stirring at 55° C. and subsequently stirred for 4 hours at 65° C. The acetone is evaporated, the aqueous solution filtered while hot and the filtrate diluted with 1000 ccs. of a 35% sodium chloride solution. The bis - [N' - (3'.6'-naphthalene-disulphonic acid - 2') -carbamido-N-phenyl-4]-sulphone probably formed precipitates after addition of a small quantity of concentrated hydrochloric acid, it is sucked off and dried at 100° C. 76 grams are obtained which are readily soluble in warm water.

Example 23

19 grams of 2-naphthylamino-6-carboxylic acid are dissolved in 50 ccs. of 2-normal sodium hydroxide solution and 200 ccs. of water and 15 grams of diphenylsulphone-4.4'-di-isocyanate in 250 ccs. of acetone are added drop by drop while stirring at 55° C. After 3 hours' stirring the acetone is evaporated, the aqueous solution is filtered and the filtrate poured into 1000 ccs. of a 35% sodiumchloride solution while stirring. The bis-[N' - (6' - carboxy-naphthyl-2')carbamido-N-phenyl-4]-sulphone probably formed precipitates, is sucked off and dried at 100° C. The yield amounts to 30 grams.

Example 24

34.7 grams of sodium-2-naphthylamino-4.8-disulphonate are dissolved in 150 ccs. of water and an acetone solution of 15 grams of diphenylsulphone-4.4'-di-iso-cyanate in 100 ccs. of acetone is added drop by drop while stirring at 50° C. After 3 hours' stirring at 60° C. the acetone is evaporated, the remaining aqueous solution is filtered and the filtrate is poured into 900 ccs. of 35% sodiumchloride solution while stirring. The bis-[N'-(4'.8'-naphthalene-disulphonic acid - 2') - carbamido-N-phenyl-4]-sulphone probably formed precipitates, is sucked off and dried at 100° C. The yield amounts to 31 grams. The product is soluble in water.

In an analogous manner 22 grams of a condensation product, probably corresponding to the bis-[N' - (6'.8' - naphthalene-disulphonic acid-2')-carbamido-N-phenyl-4]-sulphone, are obtained from 32.5 grams of the mono-sodium salt of the 2-naphthylamine-6.8-disulphonic acid and 15 grams of diphenylsulphone-4.4'-di-isocyanate.

*Example 25*

49 grams of sodium-2-naphthylamine-6-sulphonate are dissolved in 350 ccs. of water. A solution of 30 grams of di-phenylsulphone-4.4'-di-isocyanate in 250 ccs. of acetone is added drop by drop while stirring at 55-60° C. After a subsequent 4 hours' stirring at 60-65° C. the acetone is evaporated and the remaining aqueous solution is filtered while hot. The filtrate is poured into 1000 cs. of a 35% sodium chloride solution while stirring and the bis-[N'-(6'-naphthalene - sulphonic acid-2')carbamido-N-phenyl-4]-sulphone probably formed is sucked off, pressed off and dried at 100° C. The yield amounts to 75.5 grams. The product is soluble in warm water.

In an analogous manner condensation products having probably the formula of the bis-[N'-(8'-naphthalene-sulphonic acid-2')-carbamido-N-phenyl-4]-sulphone (26 grams), the bis-[N'-(5'-naphthalene-sulphonic acid-2')-carbamido-N-phenyl-4]-sulphone (21.5 grams), the bis-[N'-(7' - naphthalene - sulphonic acid-2')-carbamido-N-phenyl-4]-sulphone (30 grams) are obtained from 15 grams of diphensylsulphone-4.4'-di-isocyanate and 24.5 grams of sodium-2-naphthylamine-8-sulphonate, 22.3 grams of 2-naphthylamine-5-sulphonic acid, 24.5 grams of sodium-2-naphthylamine-7-sulphonate respectively.

We claim:

1. Bis-(para - carbamido - aryl) - sulphones in which the aryl radical is a benzene radical and in which the nitrogen atoms of the carbamide groups not linked with the aryl radicals are each mono-substituted by a radical rendering the products soluble in water which radical is selected from the group consisting of the radicals of aliphatic polyhydroxy compounds derived from sugars and of lower alkyl carboxylic and sulphonic acids and aromatic carboxylic, sulphonic and sulphinic acids of benzene and naphthalene, said products, in so far as they contain an acid group in the form of their alkali and alkaline earth metal-, ammonium- and amine-salts, are soluble in water with neutral reaction.

2. The products of the formula

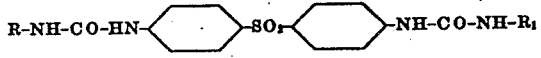

wherein R and R₁ stand for a radical rendering the products soluble in water which radical is selected from the group consisting of the radicals of aliphatic polyhydroxy compounds derived from sugars and of lower alkyl carboxylic and sulphonic acids and aromatic carboxylic, sulphonic and sulphinic acids of benzene and naphthalene, said products, in so far as they contain an acid group in the form of their alkali and alkaline earth metal-, ammonium- and amine-salts, are soluble in water with neutral reaction.

3. Bis-(para - carbamido - aryl) - sulphones in which the aryl radical is a benzene radical and in which the nitrogen atoms of the carbamide groups not linked with the aryl radicals are each mono-substituted by a naphthalene sulphonic acid radical, which products are in the form of their alkali and alkaline earth metal-, ammonium- and amine-salts soluble in water with neutral reaction.

4. The products of the formula

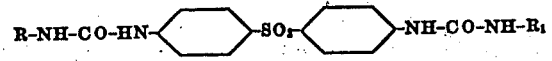

wherein R and R₁ stand for a naphthalene sulphonic acid radical, which products are in the form of their alkali and alkaline earth metal-, ammonium- and amine-salts soluble in water with neutral reaction.

5. The products of the formula

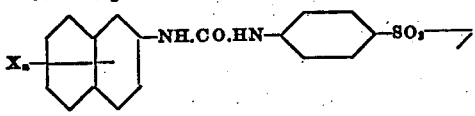

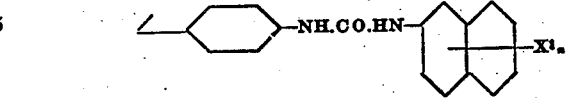

wherein X and X¹ stand for a sulphonic acid group and n stands for one of the numbers 1, 2 and 3, which products are in the form of their alkali and alkaline earth metal-, ammonium- and amine-salts soluble in water with neutral reaction.

6. The process which comprises reacting upon a di-phenylsulphone-4.4'-di-isocyanate with a primary organic amine the organic radical of which amine is selected from the group consisting of the radicals of aliphatic polyhydroxy compounds derived from sugars and of lower alkyl carboxylic and sulphonic acids and aromatic carboxylic, sulphonic and sulphinic acids of benzene and naphthalene.

7. The process which comprises reacting upon a di-phenylsulphone-4.4'-di-isocyanate with a primary organic amine the organic radical of which amine is selected from the group consisting of the radicals of aliphatic polyhydroxy compounds derived from sugars and of lower alkyl carboxylic and sulphonic acids and aromatic carboxylic, sulphonic and sulphinic acids of benzene and naphthalene.

8. The process which comprises reacting upon a di-phenylsulphone-4.4'-di-isocyanate with an amino naphthalene sulphonic acid.

9. The process which comprises reacting upon a di-phenylsulphone-4.4'-di-isocyanate with an aminonaphthalene sulphonate.

10. The process which comprises reacting upon a di-phenylsulphone-4.4'-di-isocyanate with an aminonaphthalene alkali metal sulphonate.

PAUL PÖHLS.
FRITZ MIETZSCH.

Disclaimer 2,297,024.—*Paul Pöhls* and *Fritz Mietzsch*, Wuppertal-Elberfeld, Germany. DIARYL-
SULPHONE DERIVATIVES. Patent dated Sept. 29, 1942. Disclaimer filed
Aug. 27, 1949, by the assignee, *Winthrop-Stearns Inc.*
Hereby enters this disclaimer to claim 7 of said patent.
[*Official Gazette October 4, 1949.*]